United States Patent [19]

Hackel et al.

[11] Patent Number: 5,168,324
[45] Date of Patent: Dec. 1, 1992

[54] WAVELENGTH METER HAVING ELLIPTICAL WEDGE

[75] Inventors: Richard P. Hackel; Mark Feldman, both of Livermore, Calif.

[73] Assignee: The United States of America as represented by the United States Department of Energy, Washington, D.C.

[21] Appl. No.: 298,812

[22] Filed: Jan. 18, 1989

Related U.S. Application Data

[63] Continuation of Ser. No. 915,200, Sep. 25, 1986, abandoned.

[51] Int. Cl.$^5$ ................................................ H01S 3/00
[52] U.S. Cl. ...................................... 356/346; 356/352
[58] Field of Search ............................... 356/346, 352

[56] References Cited

U.S. PATENT DOCUMENTS

| | | | |
|---|---|---|---|
| 3,246,557 | 4/1966 | Mertz et al. | 356/346 X |
| 3,432,238 | 3/1969 | Girard | 356/346 X |
| 3,563,663 | 2/1971 | Barringer | 356/346 |
| 4,092,070 | 5/1978 | Smithline | 356/346 |
| 4,165,938 | 8/1974 | Doyle | 356/346 |
| 4,172,663 | 10/1979 | Byer et al. | 356/346 |
| 4,173,442 | 11/1979 | Snyder | 356/346 |
| 4,355,898 | 10/1982 | Dakin | 356/346 |
| 4,426,155 | 1/1984 | Monchalin | 356/346 |
| 4,585,345 | 4/1986 | Inoue | 356/346 |
| 4,632,553 | 12/1986 | Vidrine et al. | 356/346 |

*Primary Examiner*—Mark Hellner
*Attorney, Agent, or Firm*—Miguel A. Valdes; Henry P. Sartorio; William R. Moser

[57] ABSTRACT

A wavelength meter is disclosed which can determine the wavelength of a laser beam from a laser source within an accuracy range of two parts in $10^8$. The wavelength meter has wedge having an elliptically shaped face to the optical path of the laser source and includes interferometer plates which form a vacuum housing.

7 Claims, 2 Drawing Sheets

5,168,324

WAVELENGTH METER HAVING ELLIPTICAL WEDGE

FIELD OF THE INVENTION

The United States Government has rights in this invention pursuant to Contract No. W-7405-ENG-48 between the United States Department of Energy and the University of California for operation under Lawrence Livermore National Laboratory.

This is a continuation of application Ser. No. 915,200 filed Sep. 25, 1986, now abandoned.

BACKGROUND OF THE INVENTION

The present invention relates to an improved wavelength meter for determining with high accuracy the wavelength of one or more laser beams. In particular, the present invention is related to a wavelength meter for use in an atomic vapor laser isotope separation process.

In an atomic vapor laser isotope separation (AVLIS) process, it is highly critical that the wavelength of any of the laser beams (such as organic dye lasers) utilized be determined with great accuracy. If the specific wavelengths of the lasers utilized in an AVLIS process can be determined with great accuracy, the efficiency of the AVLIS process can be increased significantly. A photoionizing CVL laser beam is used for photoionizing an atomic vapor isotope, such as $U^{235}$. The wavelength of the dye laser must be determined with higher accuracy to be suitable for AVLIS purposes. In addition, the determination of the wavelength of a laser beam has applications in processes other than an AVLIS process, such as high precision spectroscopy applications.

It would therefore be desirable to provide an improved wavelength meter which can determine the wavelength of one or more laser beams with very high accuracy.

SUMMARY OF THE INVENTION

It is an object of the present invention to provide an improved wavelength meter.

It is a more particular object to provide an improved wavelength meter having an elliptical wedge.

It is a still further object to provide an improved wavelength meter for use in an atomic vapor laser isotope separation (AVLIS) process.

In a preferred embodiment, the present invention includes mirror means for reflecting a laser beam from a laser source to a wedge means where the wedge means has an elliptically shaped face to the path of the laser beam in order to produce interfering beams having an interference pattern in an elliptical shape. The invention also includes diode array means oriented to detect the fringe patterns of the interference pattern in order to produce electrical signals corresponding to those fringe patterns. The invention also includes means for processing the electrical signals to accurately determine the wavelength of the laser source.

Additional objects, advantages and novel features of the present invention will be set forth in the description which follows and in part become apparent to those skilled in the art upon examination of the following or may be learned by practice of the invention. The objects and advantages of the invention may be realized and obtained by means of the instrumentalities and combinations which are pointed in the appended claims.

BRIEF DESCRIPTION OF THE DRAWINGS

The accompanying drawings, which are incorporated in and form a part of this specification, illustrate the preferred embodiment of the invention and, together with the description, serve to explain the principles of the invention.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
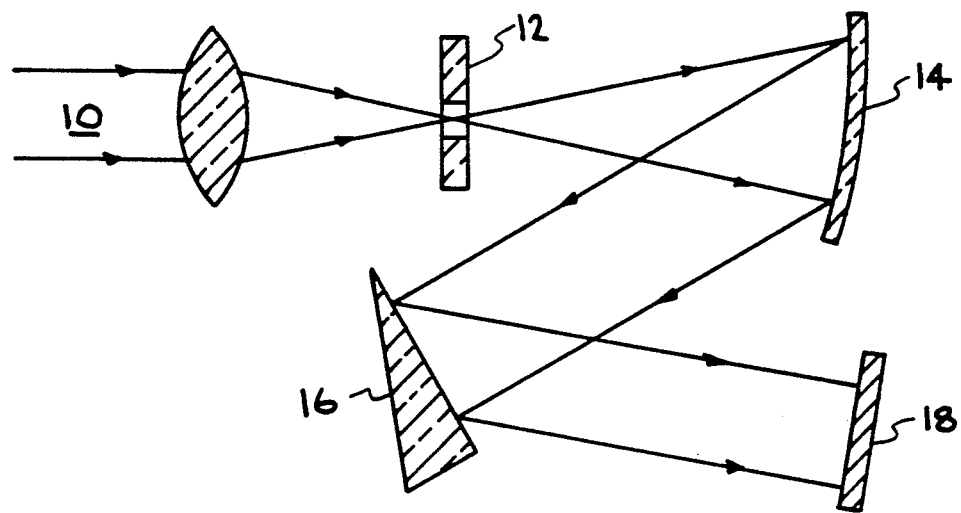
FIG. 1 depicts a geometrical view of a prior art wavelength meter.

Referring now to FIG. 1, a geometrical view of a prior art wavelength meter is depicted, such as described in U.S. Pat. No. 4,173,442. In FIG. 1, an input from a light source, typically a laser beam 10, is passed through a spatial filter 12 to what is known as an off-axis parabola 14, which in turn reflects the light beam 10 to a wedge 16 which is illustrated in more detail in FIG. 2.

Figure 2:
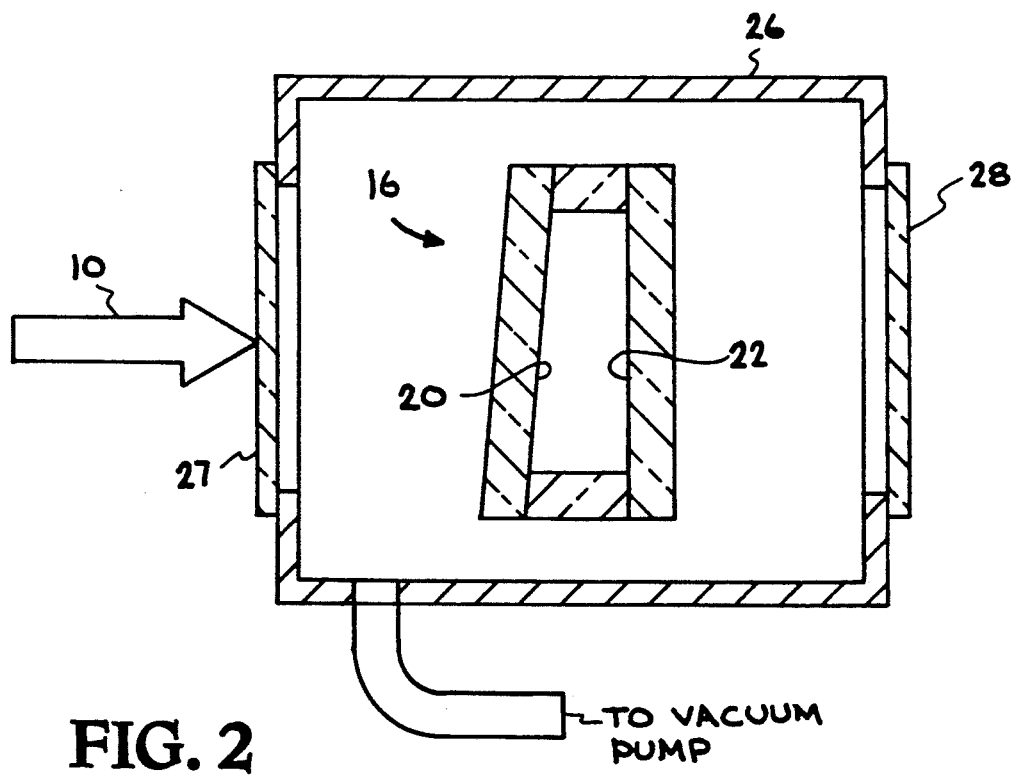
FIG. 2 depicts a more detailed portion of a wedge which forms a portion of FIG. 1.
Figure 3:
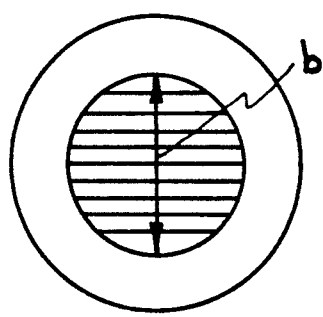
FIG. 3 depicts a resulting interference pattern formed by the prior art wedge of FIG. 2.

In FIG. 2, the wedge 16 of FIG. 1 serves to reflect the laser beam 10 via surfaces 20, 22 to form beams having constructive and destructive interference patterns. The resulting interference pattern is illustrated in FIG. 3. The wedge of FIG. 2 typically has a width of approximately one millimeter. In FIG. 2, the wedge 16 is contained within a vacuum housing 26, which includes windows 27, 28. Vacuum housing 26 is evacuated by a suitable vacuum pump (not shown). One problem with such an arrangement in FIG. 2 is that light passing through the housing can be dispersed, which can affect the accuracy of the meters.

Referring again to FIG. 1, a wedge 16 reflects the interference patterns to a diode array 18, which serves to generate electrical signals corresponding to the constructive and destructive interference fringe patterns.

Figure 4:
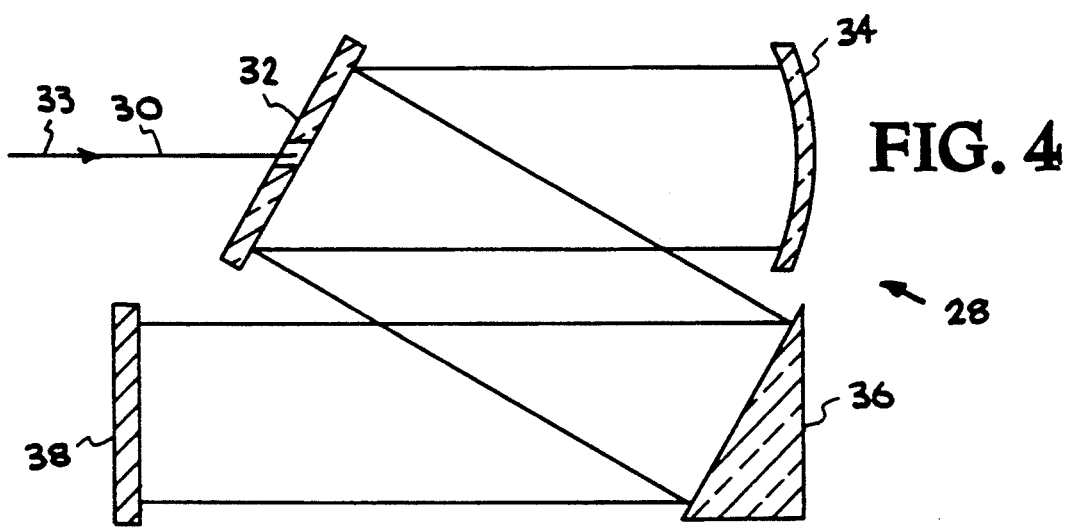
FIG. 4 depicts a geometrical view of an improved wavelength meter according to the present invention.

Referring now to FIG. 4, a geometrical view of an improved wavelength 28 according to the present invention is illustrated, wherein a laser beam 33 is input to the wavelength meter 28 on a single mode fiber 30 into a turning mirror 32 having an aperture of approximately 2 millimeters. The beam input through turning mirror 32 is reflected from a spherical mirror 34 back to the turning mirror 32, which in turn reflects the beam 33 to wedge 36.

Wedge 36 serves the same functional purpose as prior art wedges for generating an interference fringe pattern for a diode array. However, wedge 36 is illustrated in more detail in FIG. 6, in which the wedge dimension is approximately three millimeters, rather than one millimeter of prior art approaches. In addition, wedge 36 of FIG. 6 includes interferometer plates 37, 38 which form a vacuum housing, thus eliminating additional optical surfaces as utilized in the prior art. Spacers 39 may be formed of highly polished, low thermal expansion material and may be coated to prevent optical contact with the interferometer plates 37, 38.

Figure 5:
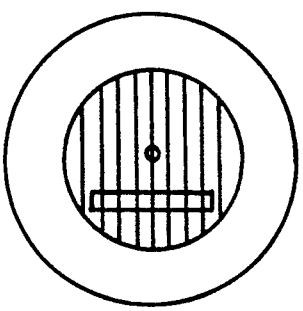
FIG. 5 depicts a diagram illustrating an interference pattern according to the present invention.
Figure 7:
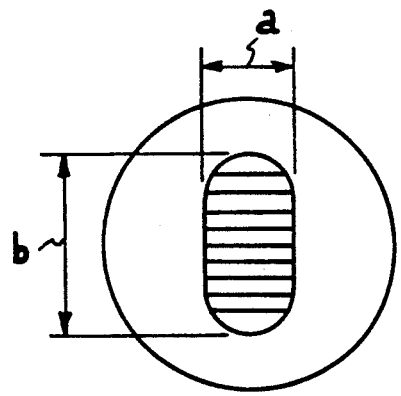
FIG. 7 depicts the elliptical orientation for the interference pattern formed by the wedge of FIG. 6.
Figure 6:
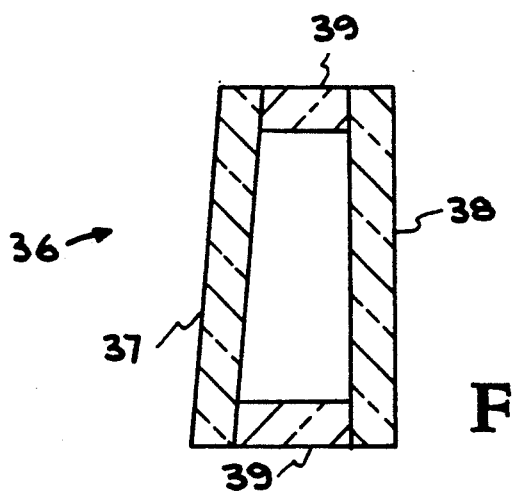
FIG. 6 depicts a more detailed view of a wedge which forms part of the invention.

An end view of the wedge 36 of FIG. 6 is illustrated having a major axis B and a minor axis A as seen in FIG. 7. It has been observed that by providing an elliptical shape to the optical path of a laser source (or other light beam), the present invention can provide greatly improved accuracy by arranging the diode array along the major axis B. This is illustrated in more detail in FIG. 5, wherein the diode array 38 of FIG. 4 is arranged to detect the interference pattern in the region of FIG. 5 (what can be characterized as high accuracy detection).

With suitable processing capability of the electrical signals generated by diode array 38 corresponding to the constructive and destructive interfering fringe patterns, the wavelength of the particular light source under observation can be determined within two parts within $10^8$, which is desirable for AVLIS purposes.

The present invention, however, is applicable not just to AVLIS applications, but in addition to other applications which require high precision spectroscopy in the accuracy range indicated above.

The foregoing description of the preferred embodiment of the invention has been presented for purposes of illustration and description. It is not intended to be exhaustive or to limit the invention to the precise form disclosed and many modifications and variations are possible in light of the above teaching. The preferred embodiment was chosen and described in order to best explain the principles of the invention and its practical applications to thereby enable others skilled in the art to best utilize the invention and various embodiments and with various modifications as are suited to the particular use contemplated. For example, the present invention could be utilized for AVLIS and high precision spectroscopy applications, as described above. It is intended that the scope of the invention be defined only by the claims appended hereto.

What is claimed is:

1. A wavelength meter apparatus comprising
   wedge means,
   mirror means for reflecting a laser beam form a laser source to said wedge means, said wedge means having an elliptical shaped face to the path of said laser beam to produce interfering beams having an interference pattern in an elliptical shape, said wedge means further including interferometer plates which form an integral vacuum housing,
   diode array means oriented along the major axis of said wedge means to detect the fringe patterns of said interference pattern to produce electrical signals corresponding thereto, and
   means for processing said electrical signals to determine the wavelength of said light beam.

2. The apparatus of claim 1 wherein the thickness of said wedge means is approximately three millimeters.

3. The apparatus of claim 2 including a single mode fiber for inputting said laser beam into said mirror means.

4. The apparatus of claim 3 wherein said mirror means includes a beam steering turning mirror and a spherical mirror arranged to reflect said laser beam to said wedge means.

5. A wavelength meter apparatus comprising
   wedge means,
   mirror means for reflecting a light beam from a light source to said wedge means, said wedge means having elliptical shaped face to the path of said light beam to produce interfering beams having an interference pattern in an elliptical shape, said wedge means further including interferometer plates which form an integral vacuum housing,
   diode array means oriented along the major axis of said wedge means to detect the fringe patterns of said interference pattern to produce electrical signals corresponding thereto, and
   means for processing said electrical signals to determine the wavelength of said light beam within two parts in $10^8$.

6. In an atomic vapor laser isotope separation process, wavelength meter apparatus for use in said AVLIS process, said apparatus comprising
   wedge means,
   mirror means for reflecting said laser beam from a laser source to said wedge means, said wedge means having an elliptical shaped face to the path of said laser beam to produce interfering beams having an interference pattern in an elliptical shape, said wedge means further including interferometer plates which form an integral vacuum housing,
   diode array means oriented along the major axis of said wedge means to detect the fringe patterns of said interference pattern to produce electrical signals corresponding thereto, and
   means for processing said electrical signals to determine the wavelength of said light beam.

7. The apparatus as in claim 5 including spacer means having a coating to prevent optical contact with said interferometer plates.

* * * * *